(12) United States Patent
Awadi et al.

(10) Patent No.: US 9,399,462 B2
(45) Date of Patent: Jul. 26, 2016

(54) METHODS AND SYSTEMS FOR CONTROLLING ENGINE STOPPING AND STARTING

(71) Applicant: Ford Global Technologies, LLC, Dearborn, MI (US)

(72) Inventors: Ahmed Awadi, Farmington Hills, MI (US); Mark Douglas Malone, Canton, MI (US); William Najib Mansur, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 460 days.

(21) Appl. No.: 13/962,137

(22) Filed: Aug. 8, 2013

(65) Prior Publication Data

US 2015/0046070 A1 Feb. 12, 2015

(51) Int. Cl.
| | |
|---|---|
| *F02N 11/08* | (2006.01) |
| *B60W 20/00* | (2016.01) |
| *B60W 10/02* | (2006.01) |
| *B60W 10/06* | (2006.01) |
| *F02D 25/00* | (2006.01) |
| *F02D 17/04* | (2006.01) |
| *F02D 29/02* | (2006.01) |
| *F02D 13/02* | (2006.01) |
| *F02B 75/12* | (2006.01) |

(52) U.S. Cl.
CPC .............. *B60W 20/40* (2013.01); *B60W 10/02* (2013.01); *B60W 10/06* (2013.01); *F02D 17/04* (2013.01); *F02D 25/00* (2013.01); *F02D 29/02* (2013.01); *F02N 11/0818* (2013.01); *F02N 11/0833* (2013.01); *F02B 2075/125* (2013.01); *F02D 13/0219* (2013.01); *F02N 2200/0802* (2013.01); *Y02T 10/48* (2013.01); *Y10S 903/905* (2013.01); *Y10S 903/93* (2013.01)

(58) Field of Classification Search
CPC ............ F02N 11/0818; F02N 11/0833; F02N 11/084; F02N 2200/00802; F02N 2200/0809; F02N 2200/0812
USPC ......................................... 701/112; 123/179.4
See application file for complete search history.

(56) References Cited

U.S. PATENT DOCUMENTS

| | | | |
|---|---|---|---|
| 7,091,629 B2 * | 8/2006 | Hawkins ............. | F02N 11/0803 123/179.4 |
| 2006/0231304 A1 * | 10/2006 | Severinsky ........... | B60H 1/004 180/65.23 |

(Continued)

FOREIGN PATENT DOCUMENTS

WO 2009011809 A1 1/2009

OTHER PUBLICATIONS

Doering, Jeffrey Allen et al., "Methods and Systems for a Vehicle Driveline," U.S. Appl. No. 13/776,286, filed Feb. 25, 2013, 176 pages.

*Primary Examiner* — Erick Solis
(74) *Attorney, Agent, or Firm* — David Kelley; Alleman Hall McCoy Russell & Tuttle LLP (57) ABSTRACT

Systems and methods for improving operation of a start/stop vehicle are presented. One method includes deactivating an engine start/stop mode in response to an electrical load of a trailer coupled to a vehicle. By deactivating the engine start/stop mode, it may be possible to conserve consumption of electrical energy and maintain state of battery charge to ensure the vehicle has sufficient electrical energy to restart the engine.

20 Claims, 7 Drawing Sheets

(56) References Cited

U.S. PATENT DOCUMENTS

| | | | | |
|---|---|---|---|---|
| 2012/0010044 A1* | 1/2012 | Gibson | ............... | B60W 10/023 477/52 |
| 2012/0010045 A1* | 1/2012 | Nedorezov | .......... | B60W 10/023 477/79 |
| 2013/0035839 A1* | 2/2013 | Otanez | ................ | F02N 11/0837 701/102 |

* cited by examiner

METHODS AND SYSTEMS FOR CONTROLLING ENGINE STOPPING AND STARTING

FIELD

The present description relates to a system and methods for controlling whether or not an engine is automatically stopped and started. The methods may be particularly useful for hybrid vehicles that include a driveline with a disconnect clutch.

BACKGROUND AND SUMMARY

An engine of a vehicle may be automatically stopped when if there is no immediate need for the engine's torque output. The engine may be restarted if a greater amount of torque is requested to propel the vehicle. Further, if the vehicle is a hybrid vehicle, it may be desirable to open a driveline disconnect clutch when engine rotation is being stopped so that a driveline integrated starter/generator may efficiently provide torque to propel the vehicle. The driveline disconnect clutch may be closed and the engine may be restarted when a driver demand torque increases. However, frequently starting and stopping the vehicle may increase electrical energy consumption of the vehicle. Further, if the engine has to restart to provide low levels of vehicle acceleration, stopping the engine may not conserve as much fuel as is desired and vehicle driveline degradation may increase.

The inventors herein have recognized the above-mentioned disadvantages and have developed a method for operating an engine of a vehicle, comprising: in an engine start/stop mode, selectively automatically stopping and starting the engine in response to vehicle operating conditions while a transmission of the vehicle is in a forward gear; and deactivating the engine start/stop mode in response to an electrical load of a trailer coupled to the vehicle.

By deactivating an engine start/stop mode in response to an electrical load of a trailer coupled to a vehicle, it may be possible to provide the technical result of reducing electrical consumption and maintaining battery state of charge so that the vehicle may be reliably restarted. Additionally, the engine start/stop mode may be deactivated in response to vehicle mass and/or the combined mass of the vehicle and a trailer. Consequently, the vehicle may respond more rapidly and with more torque than compared to if the vehicle were operated in an engine start/stop mode. Thus, vehicle launch may be improved by deactivating the engine start/stop mode.

The present description may provide several advantages. In particular, the approach may reduce electrical energy consumption by a vehicle so that there may be sufficient electrical energy to restart an engine of the vehicle. Further, the approach may improve launch of a vehicle from stop when a trailer is coupled to the vehicle. Further still, the approach may reduce driveline wear, thereby increasing the operating life of the driveline.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
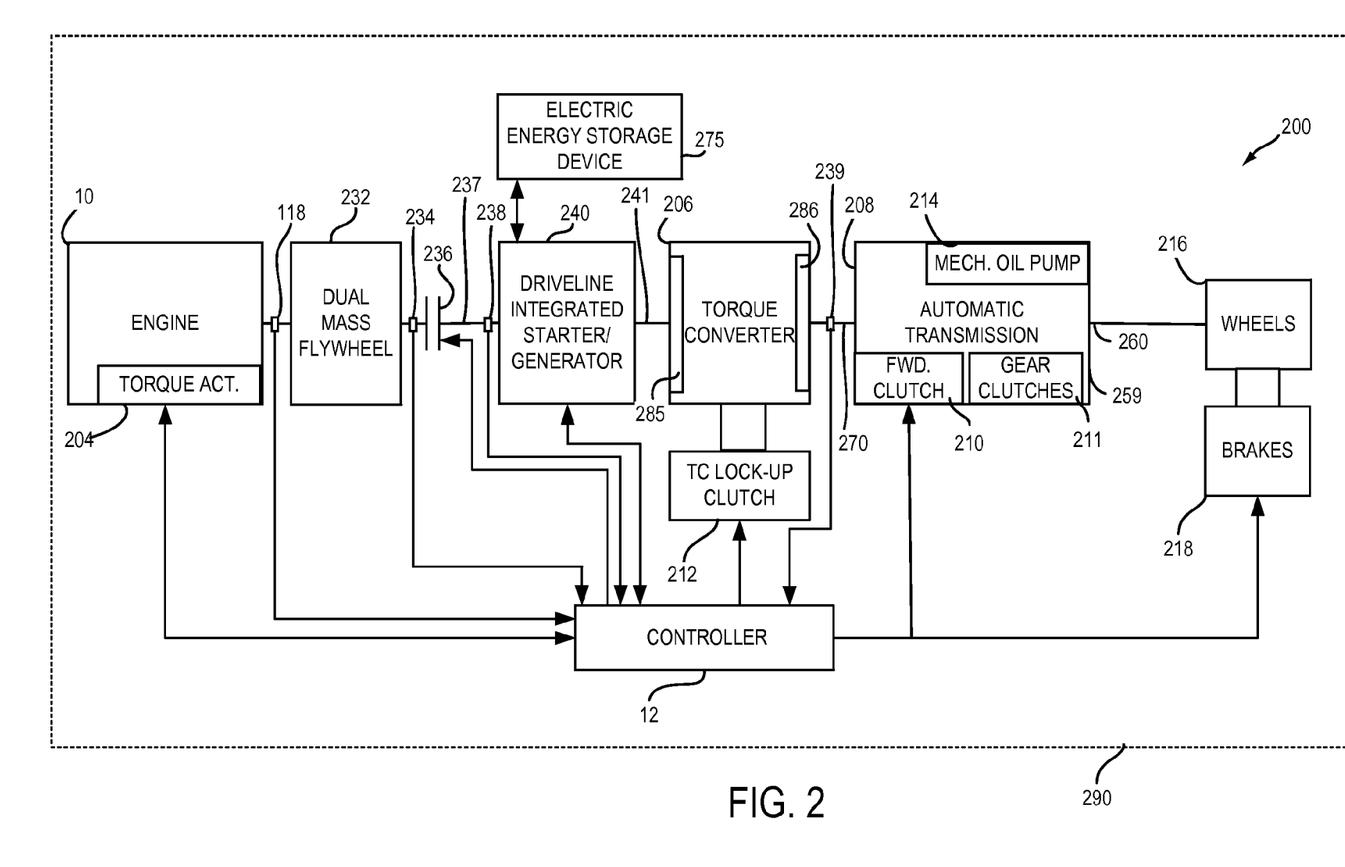
FIG. 2 is shows an example vehicle driveline configuration.
Figure 3:
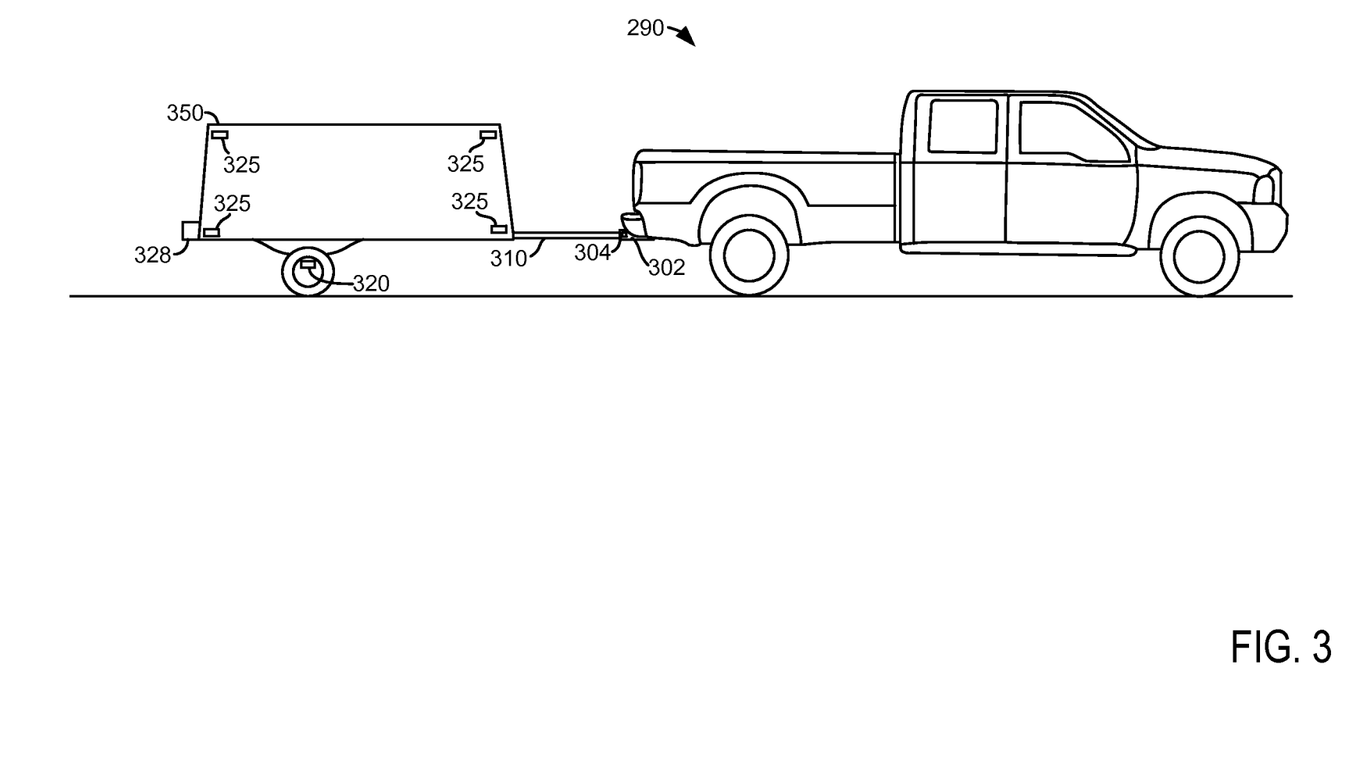
FIG. 3 shows an example vehicle and trailer configuration.
Figure 4:
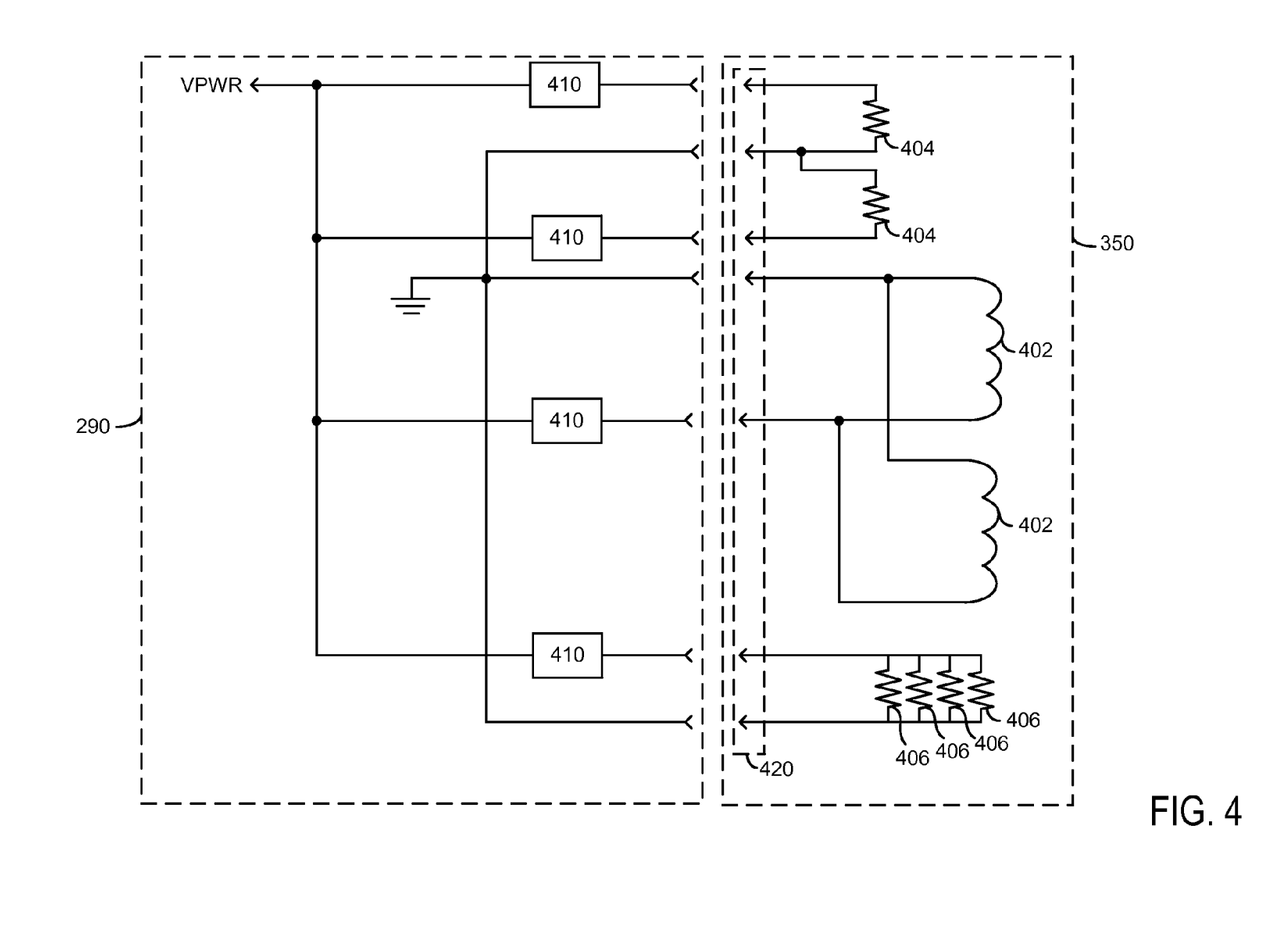
FIG. 4 shows an example electrical circuit providing electrical power to a trailer.

The present description is related to controlling operation of an engine of a start/stop vehicle. In one example, the engine may be included in a hybrid vehicle as is shown in FIG. 2. The engine may be part of a vehicle as shown in FIG. 3. The vehicle may also tow a trailer as shown in FIG. 3. The trailer and vehicle may be electrically coupled as shown in FIG. 4 so that the trailer has running lights and brake lights. The presence or absence of a trailer coupled to the vehicle may be determined via the circuits shown in FIGS. 5A and 5B. The engine start/stop functionality may be provided as shown in FIG. 6 according to the method of FIG. 7. The method of FIG. 7 describes various vehicle operating conditions that may contribute to activating or deactivating an automatic engine start/stop mode.

Figure 1:
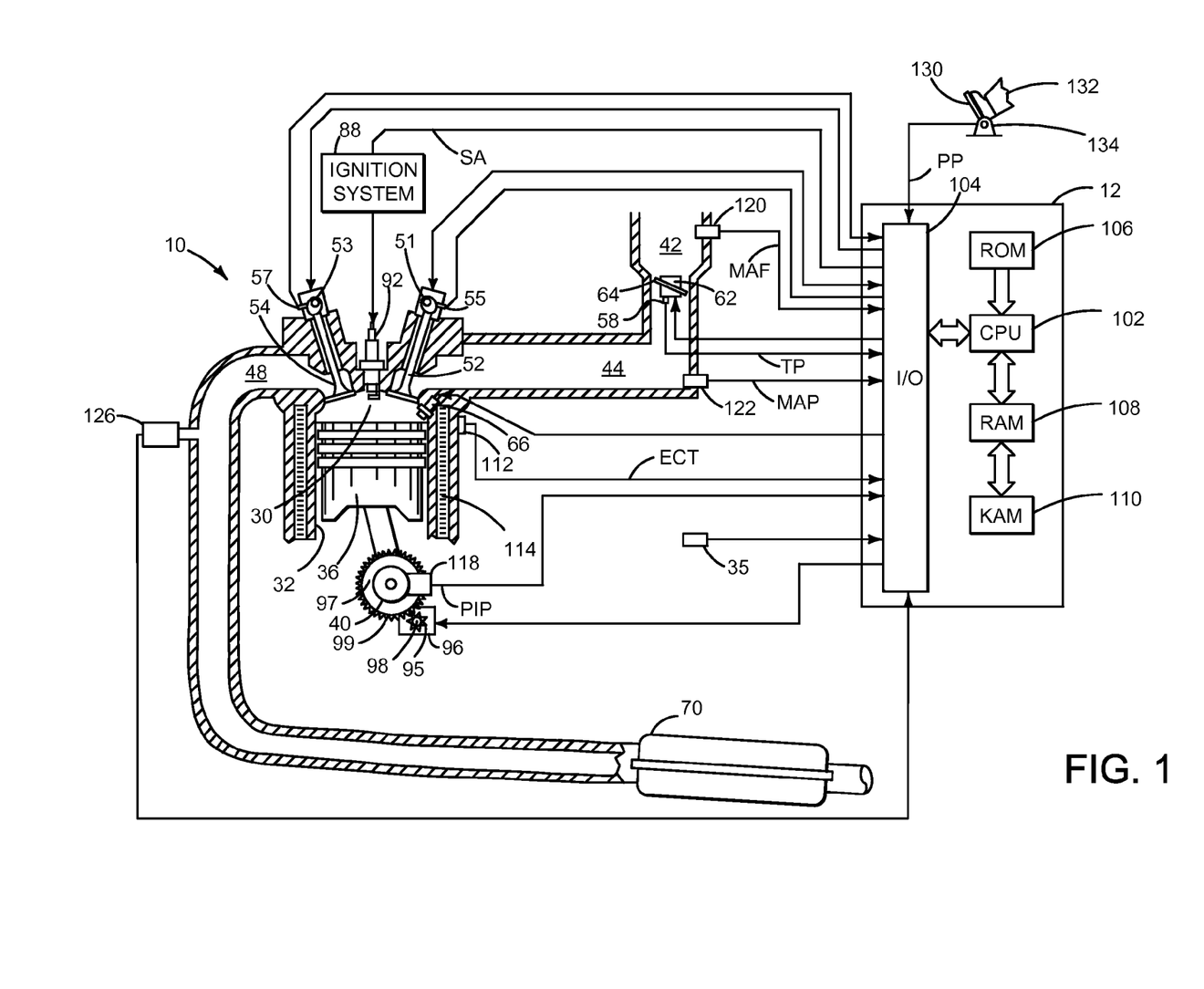
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. A temperature of catalytic converter 70 may be measured or estimated via engine speed, engine load, engine coolant temperature, and spark timing.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; a measure of road grade from inclinometer 35, and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 and vehicle 290. Driveline 200 may be powered by engine 10. Engine 10 may be started with an engine starting system shown in FIG. 1 or via driveline integrated starter/generator (DISG) 240. Further, engine 10 may generate or adjust torque via torque actuator 204, such as a fuel injector, throttle, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of driveline disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1 and may be used to start engine 10. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from windings of DISG as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch(es) to the transmission case 259 and vehicle. A transmission clutch pressure may be varied (e.g., increased) to adjust the engagement state of a transmission clutch, and provide a desired amount of transmission torsion. When restart conditions are satisfied, and/or a vehicle operator wants to launch the vehicle, controller 12 may reactivate the engine by resuming cylinder combustion.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted. In alternative examples, the vehicle system may be a series or parallel hybrid, a plug in hybrid, a motor only vehicle, or other known type of driveline.

Referring now to FIG. 3, an example vehicle and trailer configuration is shown. Vehicle 290 is shown mechanically coupled to trailer 350. Additionally, vehicle 290 may be electrically coupled to trailer 350 as shown in FIG. 4 or by another known means. Trailer includes brakes 320 which may be electrically actuated in response to an electrical signal from controller 12 or a similar controller in vehicle 290. Trailer 350 also includes running lights 325 to show the position of trailer 350. Trailer 350 also includes brake lights 328 to indicate when a driver of vehicle 290 is applying vehicle brakes. Trailer 350 includes a tongue 310 that is coupled to receiver 302. Strain gauge sensor 304 may provide an indication of when trailer 350 is coupled to vehicle 290. In other examples, trailer 350 may be of a goose neck configuration or other configuration. Further, controller 12 may communicate with trailer 350 via a CAN bus, smart bus, wireless, network, or other may for communicating between controllers.

Referring now to FIG. 4, an example circuit providing electrical power to a trailer is shown. Trailer 350 includes an electrical connector 420 with electrical contacts leading to electrical brakes 402, running lights 406, and brake lights 404. Vehicle 290 includes circuits 410 for detecting the presence of trailer 350 and monitoring current used by trailer 350. In one example, circuit 410 is comprised of a smart field effect transistor that monitors current flow to trailer 350. Thus, current to electrical brakes 402, running lights 406, and brake lights 404 may be determined. In another example, circuit 410 may be similar to the circuit shown in FIG. 5A.

Circuits 410 may be active when trailer 350 is coupled to vehicle 290 so that current flows from circuits 410 to the trailer components. The amount of current flow is measured or routed to controller 12 for determining whether or not the engine start/stop mode is to be activated. Additionally, the current flow may be used to determine whether or not a driveline disconnect clutch should be opened.

Figure 5A:
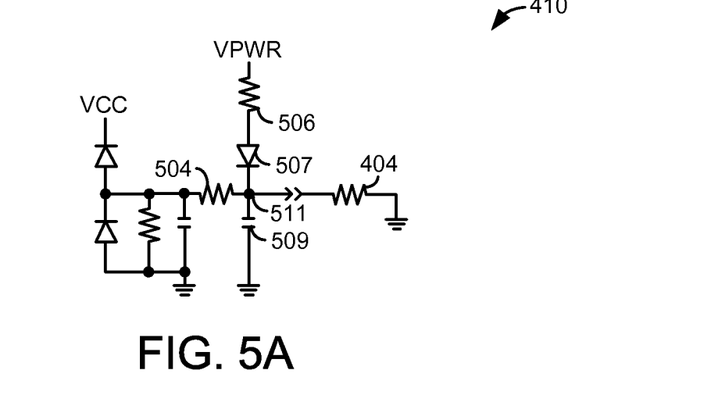
FIG. 5A shows a first example electrical circuit for detecting presence of a trailer.
Figure 6:
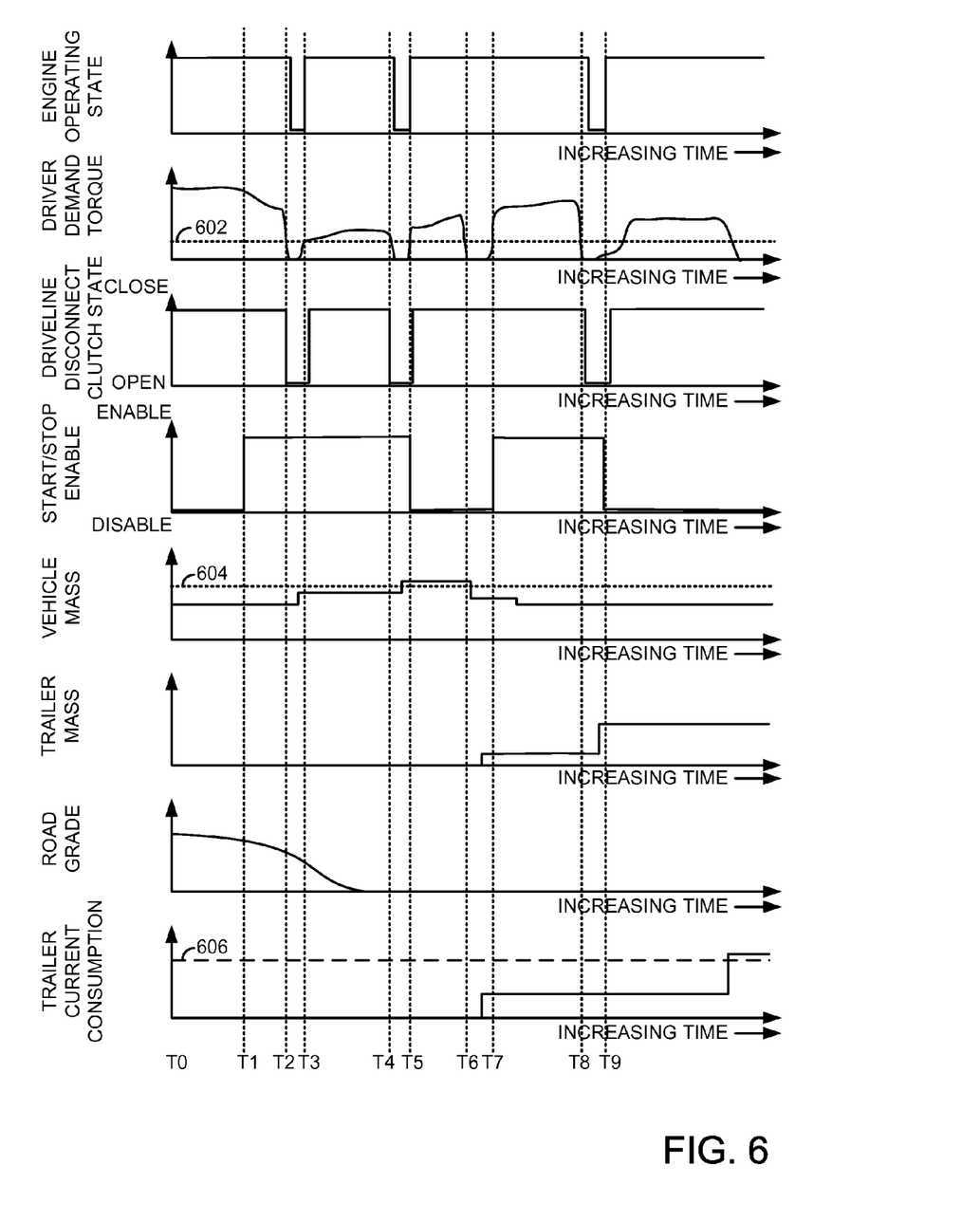
FIG. 6 shows a prophetic vehicle operating sequence.

Referring now to FIG. 5A, a first example circuit for determining whether or not a trailer is coupled to a vehicle is shown. Additionally, circuit 410 may supply power to the trailer's electrical components.

Circuit 410 includes a first resistor 506 between power source VPWR and diode 507. Circuit 410 also includes a second resistor 504 and a capacitor 509. When brake light 404 is connected to circuit 410, a voltage at node 511 changes. The voltage at node 511 may be monitored by controller 12 to determine whether or not a trailer is coupled to the vehicle.

Figure 5B:
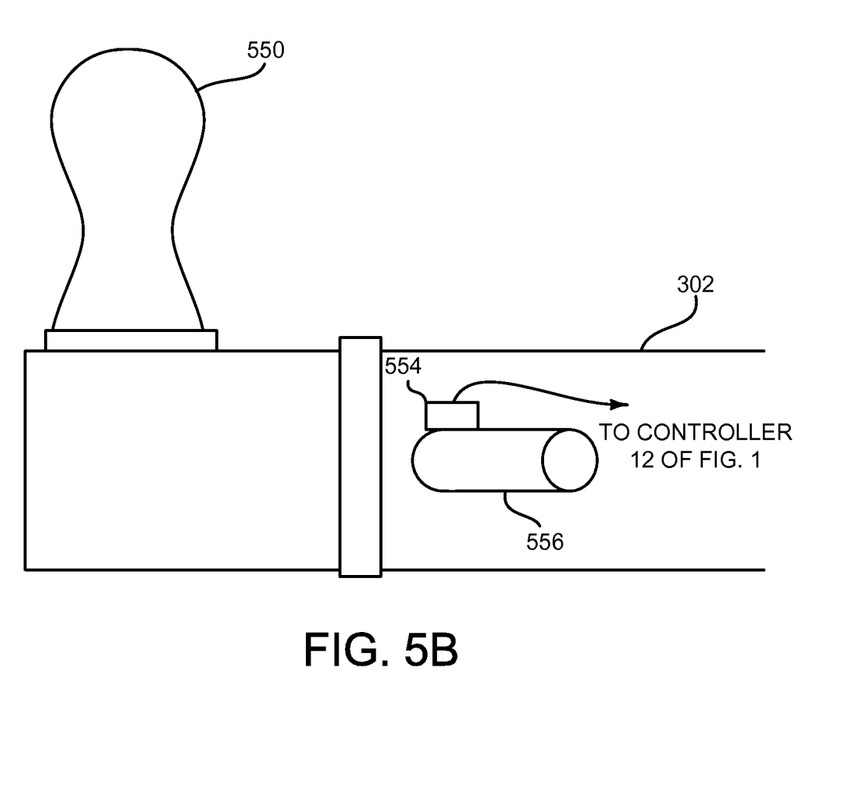
FIG. 5B shows a second example electrical circuit for detecting presence of a trailer.

Referring now to FIG. 5B, a second example electrical circuit for detecting the presence or absence of a trailer coupled to the vehicle is shown. The second circuit comprises a strain gauge 554 or alternatively a pressure sensor. If the vehicle is accelerating or decelerating and the trailer is connected to the vehicle, the strain gauge 554 outputs a voltage or current representative of the force applied to receiver 302. Strain gauge 554 is shown coupled to receiver pin 556 and output of strain gauge 554 reflects force applied to trailer ball 550 by trailer 350 shown in FIG. 3. Thus, by monitoring the output of strain gauge 554 during driving conditions, it may be determined whether or not a trailer 350 is mechanically coupled to vehicle 290.

Thus, the system of FIGS. 1-5 provides for a vehicle system, comprising: a vehicle an engine coupled to the vehicle and a transmission; a trailer coupled to the vehicle; and a controller including non-transitory instructions executable to deactivate an engine start/stop mode in response to a condition of the trailer. The vehicle system includes where the condition of the trailer include the electrical load of the trailer. The vehicle system includes where the engine start stop/mode is deactivated in response to a current drawn from the vehicle to the trailer exceeding a threshold current. The vehicle system includes where the condition of the trailer is a mass of the trailer. The vehicle system further comprises a driveline disconnect clutch and deactivating opening the driveline disconnect clutch in response to the condition of the trailer. The vehicle system further comprises additional instructions to deactivated the engine start/stop mode in response to a road grade.

Referring now to FIG. 6, an example driveline operating sequence is shown. The sequence of FIG. 6 may be provided via the system of FIGS. 1 and 2 executing instructions stored in non-transitory memory according to the method of FIG. 7. The sequence of FIG. 6 shows vertical markers T0-T9 which indicate particular times of interest during the operating sequence. All plots in FIG. 6 are referenced to the same time scale and occur at the same time.

The first plot from the top of FIG. 6 is a plot of engine operating state versus time. The X axis represents time and time begins at the left side of FIG. 6 and increases to the right side of FIG. 6. The Y axis represents engine operating state and the engine is operating when the engine operating state is at a high level. The engine is not operating when the engine operating state is at a lower level.

The second plot from the top of FIG. 6 is a plot of driver demand torque versus time. The X axis represents time and time begins at the left side of FIG. 6 and increases to the right side of FIG. 6. The Y axis represents driver demand torque and driver demand torque increases in the direction of the Y axis arrow. Horizontal line 602 represents a threshold driver demand torque where the engine may be started to provide the requested driver demand torque.

The third plot from the top of FIG. 6 is a plot of driveline disconnect clutch state versus time. The X axis represents time and time begins at the left side of FIG. 6 and increases to the right side of FIG. 6. The Y axis represents driveline disconnect clutch state and the driveline disconnect clutch state is open when the trace is at a lower level and closed when the trace is at a higher level.

The fourth plot from the top of FIG. 6 is a plot of engine start/stop enable status versus time. The X axis represents time and time begins at the left side of FIG. 6 and increases to the right side of FIG. 6. The Y axis represents engine start/stop enable status and engine start/stop mode is enabled when the trace is at a higher level. Engine start/stop mode is not enabled when the trace is at a lower level.

The fifth plot from the top of FIG. 6 is a plot of vehicle mass versus time. The X axis represents time and time begins at the left side of FIG. 6 and increases to the right side of FIG. 6. The Y axis represents vehicle mass and vehicle mass increases in the direction of the Y axis arrow. Horizontal line 604 represents a threshold vehicle mass where engine start/stop mode may be deactivated so as to provide improved vehicle launch in the presence of greater vehicle mass.

The sixth from the top of FIG. 6 is a plot of trailer mass versus time. The X axis represents time and time begins at the left side of FIG. 6 and increases to the right side of FIG. 6. The Y axis represents trailer mass and trailer mass increases in the direction of the Y axis arrow.

The seventh from the top of FIG. 6 is a plot of road grade versus time. The X axis represents time and time begins at the left side of FIG. 6 and increases to the right side of FIG. 6. The Y axis represents road grade and road grade increases in the direction of the Y axis arrow.

The eighth from the top of FIG. 6 is a plot of trailer electrical current consumption versus time. The X axis represents time and time begins at the left side of FIG. 6 and increases to the right side of FIG. 6. The Y axis represents trailer electrical current consumption and trailer electrical current consumption increases in the direction of the Y axis arrow. Horizontal line 606 represents a threshold trailer current consumption level where engine start/stop mode may be deactivated so as to improve the possibility of engine starting and elevate battery state of charge.

At time T0, the engine operating state is at a higher level indicating that the engine is operating. The driver demand torque is also at a higher level. The driver demand torque may be determined from a position of an accelerator pedal. The driveline disconnect clutch is in a closed state and the engine start/stop enable status is indicating that engine start/stop mode is deactivated. The engine stop/start mode is deactivated in response to the road grade being at a higher level. The trailer mass is zero indicating that a trailer is not coupled to the vehicle. The trailer current consumption is also at zero.

At time T1, the road grade has been reduced to a level where engine start/stop may be activated. Therefore, the engine start/stop enable status changes state to a higher level to indicate that the engine may be operated in a start/stop mode. The engine remains operating and the driver demand torque remains at a higher but reduce level as compared to at time T0. The driveline disconnect clutch also remains in a closed state and the vehicle mass remains constant. The trailer mass remains at zero to indicate that no trailer is coupled to the vehicle. The trailer current consumption also remains at a lower level.

At time T2, the driver demand torque is reduced to a low level while engine start/stop mode is active. Shortly thereafter, the driveline disconnect clutch opens as indicated and the engine operating state transitions to a lower level. The engine stops rotating in response to the engine operating state changing to the lower level. The vehicle mass is at the same level at time T2 as at time T0, but mass is added to the vehicle shortly thereafter increasing the vehicle payload. The road grade continues to be reduced and trailer current consumption is zero.

Between time T2 and time T3, the vehicle mass is increased and the driver demand torque increases in response to a driver applying an accelerator pedal (not shown). The engine remains stopped and the driveline disconnect remains open.

At time T3, the driver demand torque increases to a level where the engine is restarted in response to the driver demand torque so that the driver demand torque may be met by the driveline. In this example, the engine is started via a starter while the driveline disconnect clutch is open. However, the engine may be started via the driveline disconnect clutch if desired. The driveline disconnect clutch closes shortly thereafter in response to the driver demand torque so that engine torque may be provided to the driveline. Engine start/stop mode remains enabled and vehicle mass does not increase. Further, trailer mass remains at zero as does trailer current consumption. The road grade continues to be reduced.

At time T4, the drive demand torque is again reduced to a level where the engine operating state transitions to a lower level and engine rotation stops. The driveline disconnect clutch is also opened in response to the decrease in driver demand torque. The engine start/stop remains enabled while the vehicle mass, trailer mass, and trailer current consumption remain unchanged. The road grade is also reduced to zero.

Between time T4 and time T5, the vehicle mass is increased further to a vehicle mass that is greater than the threshold vehicle mass where engine start/stop mode may be deactivated. In this example, the vehicle mass is determined when the vehicle is accelerating or decelerating. Therefore, the engine start/stop mode is not deactivated until the vehicle begins to accelerate. However, where suspension sensors are available, the engine start/stop mode may be deactivated as soon as the vehicle mass is greater than the threshold vehicle mass and the engine may be automatically restarted in response to the increase in vehicle mass.

At time T5, the driver demand torque increases in response to a driver depressing an accelerator pedal and the engine start/stop mode is deactivated in response to the vehicle mass increasing to greater than threshold mass 604. The engine is restarted in response to deactivating the engine start/stop mode and the driveline disconnect clutch is closed shortly thereafter in response to the engine start/stop mode being deactivated. The trailer mass and electrical consumption remains unchanged and the road grade remains at zero.

At time T6, the driver demand torque is reduced again in response to a driver releasing an accelerator pedal. The engine continues to operate since the engine operating state is at a higher level. The driveline disconnect clutch remains engaged in response to the engine start/stop mode being deactivated as indicated by the engine start/stop enable status being at a lower level. The vehicle mass remains at a higher level and a trailer is not coupled to the vehicle. The road grade remains zero and trailer current consumption remains at zero.

Between time T6 and time T7, the vehicle mass is lowered in response to a driver removing a portion of the vehicle payload. Additionally, the driver couples a trailer to the vehicle as indicated by the increase in trailer mass. The trailer electrical current consumption also increases.

At time T7, the driver demand torque increases in response to a driver applying an accelerator pedal. The engine start/stop mode is also reactivated in response to the reduction in vehicle mass and since the combined trailer mass and vehicle mass is less than a threshold mass. The engine remains active and the driveline disconnect clutch remains closed in response to the increasing driver demand torque.

At time T8, the driver demand torque decreases in response to a driver releasing an accelerator pedal. The driveline disconnect clutch opens and the engine operating state transitions to a lower level to indicate that the engine stops rotating in response to the reduced driver demand torque. The engine start/stop mode remains active and the vehicle mass remains at a lower level.

Between time T8 and time T9, the driver increases the trailer mass via increasing the trailer payload. The vehicle mass remains at a same level since time T8. The road grade remains at zero. The driver demand torque also begins to increase in response to a driver applying an accelerator pedal.

At time T9, the engine start/stop status changes state to deactivate the engine start/stop mode in response to the combination of vehicle mass and trailer mass exceeds a threshold mass. The engine is restarted in response to the change in the engine start/stop status even though the driver demand torque is at a lower level. The driveline disconnect clutch closes in response to the engine start/stop status deactivating the engine start/stop mode. The vehicle mass remains unchanged and the road grade remains zero.

After time T9, the engine start/stop mode remains deactivated since the combined vehicle mass and trailer mass is greater than a threshold mass. Further, the trailer current consumption exceeds the current consumption threshold 606. Therefore, the engine start/stop mode would be deactivated even if the combined trailer mass and vehicle mass were less than a threshold.

In this way, the engine start/stop mode may be selectively activated and deactivated in response to vehicle operating conditions. Further, the driveline disconnect clutch may be activated and deactivated in a similar fashion.

Figure 7:
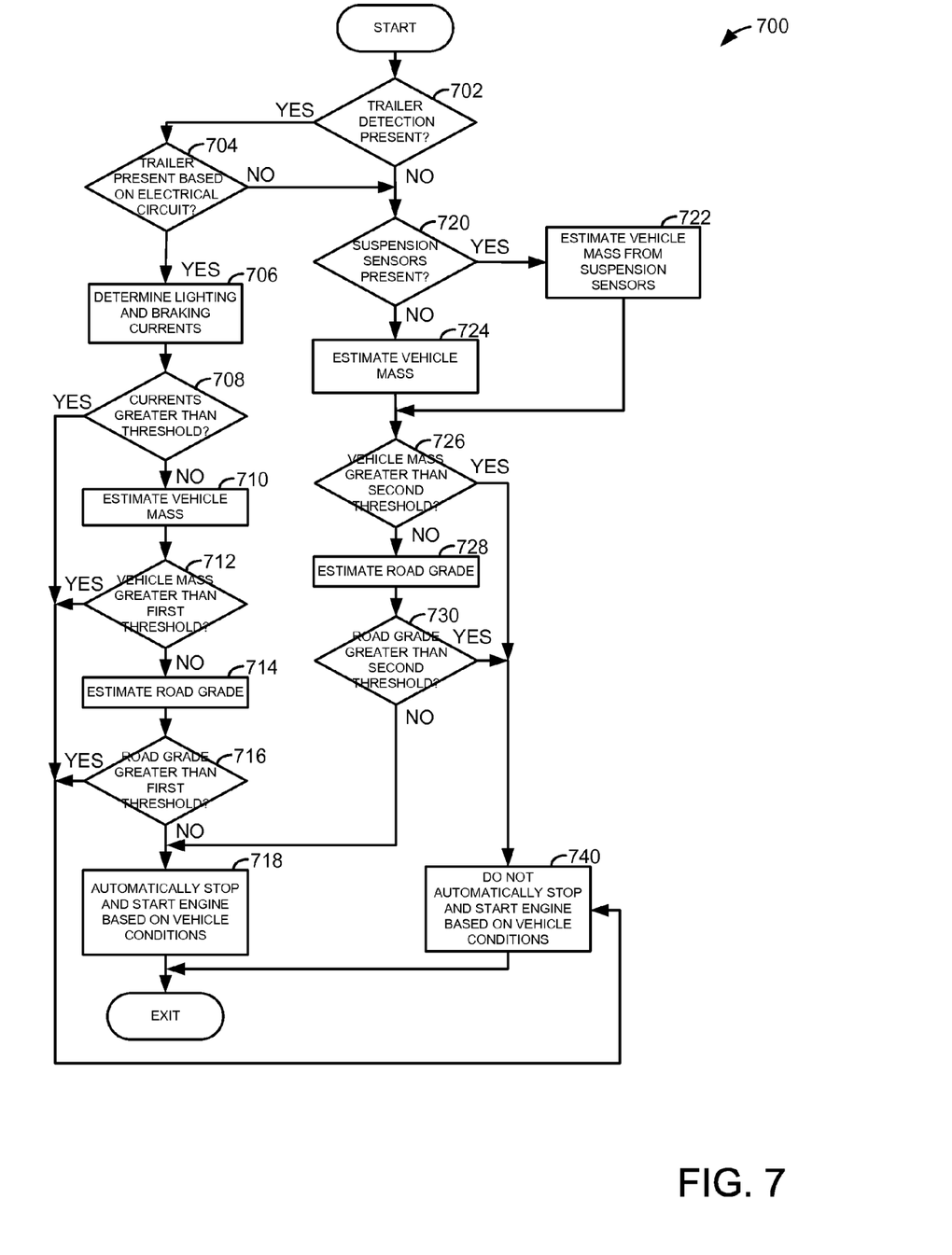
FIG. 7 is a flowchart showing one example method for operating an engine.

Referring now to FIG. 7, a method for operating an engine and driveline of a vehicle is shown. The method of FIG. 7 may be stored as executable instructions in non-transitory memory of a controller such as controller 12 in FIG. 1. Thus, the method of FIG. 7 may be incorporated in to a system as shown in FIGS. 1 and 2. The method of FIG. 7 may also provide the sequence shown in FIG. 6. In some examples, the method of FIG. 7 may be called in response to coupling an electrical connector of a trailer to the vehicle so that engine start/stop mode may be reassessed.

At 702, method 700 judges whether or not circuits or other hardware for detecting whether or not a trailer is coupled to the vehicle are present. In one example, a variable in controller memory may be set or not set based on whether or not hardware for detecting a trailer is present. If method 700 judges that the circuits or other hardware for detecting whether or not a trailer is coupled to the vehicle are present the answer is yes and method 700 proceeds to 704. Otherwise, the answer is no and method 700 proceeds to 720.

At 704, method 700 judges whether or not a trailer is present based on electrical circuit input to the controller. A trailer may be detected via the circuitry shown in FIGS. 5A and 5B, or alternatively, via a camera or a different known circuit that indicates the presence or absence of a trailer coupled to the vehicle. For example, method 700 may judge that a trailer is mechanically and electrically coupled to a vehicle if a voltage at node 511 is greater or less than a threshold voltage. If method 700 judges that a trailer is present based on the electrical circuit, the answer is yes and method 700 proceeds to 706. Otherwise, the answer is no and method 700 proceeds to 720.

At 706, method 700 determines vehicle electrical lighting and braking currents. In one example, vehicle lighting and braking currents may be determined via a field effect transistor that measures current flow as described in FIG. 4. Alternatively, vehicle lighting and braking currents may be determined via measuring a voltage across a resistor that directs electrical power to the trailer. The current to operate the vehicle's running lights may be determined separate from or with current to operate trailer brakes. Further, the trailer electrical currents may be determined at a specified frequency, or the trailer currents may be determined at specific conditions such as when the vehicle is braking Method 700 proceeds to 708 after trailer lighting and braking currents are determined.

Additionally, in some examples, the current drawn by the trailer may be determined during specific conditions, while brakes are being applied for example. In this way, a more representative peak current draw may be obtained.

At 708, method 700 judges whether or not the currents captured at 706 are greater than a threshold current. In one example, all current supplied to the trailer is added together. If the trailer current is greater than a threshold current, the answer is yes and method 700 proceeds to 740. Otherwise, the answer is no and method 700 proceeds to 710. Thus, if the current drawn by the electrical load of the trailer is greater than a threshold current draw, the engine start/stop mode may be deactivated. In other words, the electrical load of the trailer is greater than desired for engine start/stop mode to be active.

At 740, method 700 deactivates engine automatic start/stop mode where the engine may be stopped and started without a driver's input to a device or input that has a sole purpose of starting/stopping an engine (e.g., an on/off key switch or pushbutton). In one example, method may deactivate automatic engine start/stop mode via setting a value of a variable in memory that activates and deactivates engine start/stop mode. When engine start/stop mode is deactivated, the engine may not be automatically stopped. However, the engine may be automatically started when the engine start/stop mode is deactivated while the engine is stopped. Method 700 proceeds to exit after the engine start/stop mode is deactivated.

Additionally, a driveline disconnect clutch may be held in or returned to a closed state at 740. Closing the driveline disconnect clutch may be part of a process for deactivating the engine start/stop mode. Further, in some examples, the engine stop/start mode may be held in a deactivated state once deactivated until the trailer is decoupled from the vehicle.

At 710, method 700 estimates the vehicle mass. In one example vehicle mass is determined vehicle mass based on the following equations:

Where vehicle acceleration is zero,

Engine/driveline torque≈road load+grade based torque

Using: $T\_wh1 = R\_rr \cdot M\_v \cdot g \cdot \sin(\theta_1) + T\_rl1$

Where:
T_wh1=Wheel Torque on grade angle=$\theta_1$
T_wh2=Wheel Torque on grade angle=$\theta_2$
R_rr=Driven wheel rolling radius
M_v=vehicle mass estimate
g=gravity constant
$\theta_1$=grade angle
T_rl1=Road load torque at the driven wheel on grade 1
T_rl2=Road load torque at the driven wheel on grade 2
Then the vehicle mass estimate is:

$M\_v = [(T\_wh1 - T\_wh2) + (T\_rl2 - T\_rl1)] / [R\_rr \cdot g \cdot (\theta_1 - \theta_2)]$ In this example, the vehicle mass includes mass of a vehicle and of the trailer being towed by the vehicle since it has been established that the vehicle is towing a trailer at 704. Further, the vehicle mass may include mass of passengers in the vehicle and vehicle cargo. Method 700 proceeds to 712 after vehicle mass is determined.

Alternatively, if a strain gauge sensor is included as shown in FIG. 5B, the trailer mass may be estimated based on output of the strain gauge and F=ma, where F is force, m is trailer mass, and a is acceleration.

At 712, method 700 judges whether or not the combined trailer and vehicle mass is greater than a first threshold mass. The first threshold mass may be empirically determined and stored in memory. If method 700 judges that the combined vehicle and trailer mass is greater than the first threshold mass, the answer is yes and method 700 proceeds to 740. Otherwise, the answer is no and method 700 proceeds to 714.

Thus, engine start/stop mode may be activated or deactivated in response to combined mass of a vehicle and a trailer so that vehicle launch may be improved. For example, if engine start/stop mode is not activated for a large mass vehicle and trailer, it may be difficult to provide adequate vehicle acceleration after the engine has been stopped. By deactivating the engine start/stop mode, launch of a vehicle may be improved.

At 714, method 400 estimates road grade. In one example, vehicle road grade may be estimated via an inclinometer. On the other hand, if vehicle mass is known, the equation at 710 may be solved for road grade. Method 700 proceeds to 716 after road grade is estimated.

At 716, method 700 judges whether or not the road grade is greater than a first threshold road grade. The first threshold road grade may be empirically determined and stored in memory. If method 700 judges that the road grade is greater than the first threshold road grade, the answer is yes and method 700 proceeds to 740. Otherwise, the answer is no and method 700 proceeds to 718.

Thus, engine start/stop mode may be activated or deactivated in response to road grade so that vehicle launch may be improved. For example, if engine start/stop mode is not activated for a large road grade (e.g., a steep road), it may be difficult to provide adequate vehicle acceleration after the engine has been stopped. By deactivating the engine start/stop mode, launch of a vehicle on the road grade may be improved.

At 718, method 700 enables engine automatic start/stop mode while a transmission of the vehicle is in a forward gear. The engine start/stop mode may be activated by setting a state of a variable in memory of a controller. When engine automatic start/stop mode is active, the engine may be stopped and started without a driver operating a device that has a sole purpose of starting/stopping the engine. For example, the engine may be automatically stopped in response to a brake pedal being depressed, vehicle speed less than a threshold speed, and driver demand torque being less than a threshold driver demand torque. Method 700 proceeds to exit after engine automatic start/stop has been activated.

Additionally, a driveline disconnect clutch may be reactivated and allowed to open and close at 718. Opening the driveline disconnect clutch may be part of a process for activating the engine start/stop mode.

At 720, method 700 judges whether or not vehicle suspension sensor are present. Vehicle suspension sensors may be determined to be present based on a value of a variable stored in controller memory. If method 700 judges that vehicle suspension sensors are present, the answer is yes and method 700 proceeds to 722. Otherwise, the answer is no and method 700 proceeds to 724.

At 722, method 700 estimates vehicle mass based on output from vehicle suspension sensors. In one example, vehicle mass may be estimated in response to compression of the vehicle's suspension which is determined via output of vehicle suspension sensors. For example, a base vehicle suspension height may be stored in controller memory and a function or table may include mass values that correspond to a level of vehicle suspension compression. Vehicle suspension compression is determined via subtracting the vehicle suspension sensor output in compression from the vehicle suspension sensor output during base or uncompressed conditions. The amount of vehicle suspension compression is used to index the table or function of empirically determined mass values to determine the vehicle mass. In this way the vehicle payload may be determined. Additionally, the total vehicle mass including a trailer if one is coupled to the vehicle may be determined as is described at 710. The vehicle mass determined from the vehicle suspension sensors may then be subtracted from the total vehicle mass to yield the trailer mass. Method 400 proceeds to 726 after vehicle and trailer mass are determined.

At 724, method 700 estimates vehicle mass. Vehicle mass, including a trailer if one is coupled to the vehicle, may be determined as described at 710. Method 700 proceeds to 726 after the vehicle mass is determined.

At 726, method 700 judges whether or not vehicle mass is greater than a second threshold mass. The second threshold mass may be some portion including all of a gross vehicle mass. For example, the second threshold mass may be 75% of gross vehicle mass. And, the second threshold mass is less than the first threshold mass at 712. Further, if it is established that a trailer is coupled to the vehicle, method 700 judges whether or not the gross combined mass (e.g., vehicle mass plus trailer mass) is greater than a third threshold vehicle mass. The third threshold vehicle mass may be equal or greater than the first vehicle mass at 712. If method judges that the vehicle mass is greater than the second threshold mass or if the combined vehicle mass is greater than a third mass, the answer is yes and method 700 proceeds to 740. Otherwise, the answer is no and method 700 proceeds to 728.

At 728, method 700 estimates the road grade as described at 714. Method 700 proceeds to 730 after road grade is determined.

At 730, method 700 judges whether or not the road grade is greater than a second threshold road grade. If method 700 judges that the road grade is greater than the second threshold road grade, the answer is yes and method 700 proceeds to 740. Otherwise, the answer is no and method 700 proceeds to 718. In one example, the second road grade is less than the road grade first threshold at 716 if a trailer is not coupled to the vehicle.

Thus, the method of FIG. 7 provides for operating an engine of a vehicle, comprising: in an engine start/stop mode, selectively automatically stopping and starting the engine in response to vehicle operating conditions while a transmission of the vehicle is in a forward gear; and deactivating the engine start/stop mode in response to an electrical load of a trailer coupled to the vehicle. The method includes where the electrical load is based on an electrical current flow to the trailer. The method includes where the electrical load is determined when trailer brakes are applied.

In some examples, the electrical load includes trailer running lights and brake lights. The method further comprises deactivating opening of a driveline disconnect clutch in response to the electrical load. The method includes where the electrical load of the trailer is determined in response to coupling an electrical connector of the trailer to the vehicle. The method further comprises deactivating the engine stop/start mode in response to an estimate of vehicle mass based on vehicle suspension sensors.

Thus, the method of FIG. 7 provides for operating an engine of a vehicle, comprising: in an engine start/stop mode, selectively automatically stopping and starting the engine in response to vehicle operating conditions while a transmission of the vehicle is in a forward gear; and deactivating the engine start/stop mode in response to a combined mass of the vehicle and a trailer. The method includes where the trailer mass is based on a strain sensor. The method further comprises deactivating the engine start/stop mode in response to road grade and the combined mass of the vehicle.

In some examples, the method further comprises deactivating the engine start/stop mode in response to an electrical load of the trailer. The method includes where deactivating the engine start/stop mode includes starting the engine and closing a driveline disconnect clutch. The method further comprises reactivating the engine start/stop mode in response to a reduction in the combined mass of the vehicle and the trailer. The method includes where the engine start/stop mode is held deactivated until the trailer is decoupled from the vehicle.

As will be appreciated by one of ordinary skill in the art, method described in FIG. 7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine of a vehicle, comprising:
    in an engine start/stop mode, selectively automatically stopping and starting the engine in response to vehicle operating conditions while a transmission of the vehicle is in a forward gear; and
    deactivating the engine start/stop mode in response to an amount of current consumed by a trailer coupled to the vehicle exceeding a threshold, the amount of current consumed via an electrical load of the trailer coupled to the vehicle.

2. The method of claim 1, where the electrical load is based on an electrical current flow to the trailer.

3. The method of claim 1, where the electrical load is determined when trailer brakes are applied.

4. The method of claim 2, where the electrical load includes trailer running lights and brake lights.

5. The method of claim 1, further comprising deactivating opening of a driveline disconnect clutch positioned between the engine and a starter/generator in response to the electrical load.

6. The method of claim 1, where the electrical load of the trailer is determined in response to coupling an electrical connector of the trailer to the vehicle.

7. The method of claim 1, further comprising deactivating the engine start/stop mode in response to an estimate of vehicle mass based on vehicle suspension compression sensors.

8. A method for operating an engine of a vehicle, comprising:
    in an engine start/stop mode, selectively automatically stopping and starting the engine in response to vehicle operating conditions while a transmission of the vehicle is in a forward gear; and
    deactivating the engine start/stop mode in response to an amount of current supplied to trailer brakes and a combined mass of the vehicle and a trailer.

9. The method of claim 8, where the trailer mass is based on a strain sensor, and further comprising deactivating opening of a driveline disconnect clutch positioned between the engine and a starter/generator in response to an electrical load.

10. The method of claim 8, further comprising deactivating the engine start/stop mode in response to road grade and the combined mass of the vehicle.

11. The method of claim 8, further comprising deactivating the engine start/stop mode in response to an electrical load of trailer running lights.

12. The method of claim 8, where deactivating the engine start/stop mode includes starting the engine and closing a driveline disconnect clutch.

13. The method of claim 8, further comprising reactivating the engine start/stop mode in response to a reduction in the combined mass of the vehicle and the trailer.

14. The method of claim 8, where the engine start/stop mode is held deactivated until the trailer is decoupled from the vehicle.

15. A vehicle system, comprising:
a vehicle;
an engine coupled to the vehicle and a transmission;
a trailer coupled to the vehicle; and
a controller including non-transitory instructions executable to deactivate an engine start/stop mode in response to an amount of current supplied to trailer brakes when the trailer brakes are applied.

16. The vehicle system of claim 15, further comprising additional instructions to deactivate the engine start/stop mode in response to an amount of current supplied to trailer running lights.

17. The vehicle system of claim 16, where the engine start stop/mode is deactivated in response to a current drawn from the vehicle to the trailer exceeding a threshold current.

18. The vehicle system of claim 15, where a condition of the trailer is a mass of the trailer.

19. The vehicle system of claim 15, further comprising a driveline disconnect clutch and deactivating opening the driveline disconnect clutch in response to a condition of the trailer.

20. The vehicle system of claim 15, further comprising additional instructions to deactivated the engine start/stop mode in response to a road grade.

* * * * *